United States Patent [19]
Hackett, Jr.

[11] Patent Number: 5,820,271
[45] Date of Patent: Oct. 13, 1998

[54] THRUST BEARING ASSEMBLY

[76] Inventor: William F. Hackett, Jr., 79028 Lake Club Dr., Bermuda Dunes, Calif. 92201

[21] Appl. No.: 790,082

[22] Filed: Jan. 29, 1997

[51] Int. Cl.⁶ ................................................. F16C 17/08
[52] U.S. Cl. ............................................................. 384/425
[58] Field of Search ................................... 384/425, 420, 384/426, 427, 422

[56] References Cited

U.S. PATENT DOCUMENTS

| | | | |
|---|---|---|---|
| 2,701,529 | 2/1955 | Finzel . | |
| 2,867,173 | 1/1959 | Lung . | |
| 2,996,994 | 8/1961 | Wright . | |
| 3,694,110 | 9/1972 | Guinard . | |
| 3,912,343 | 10/1975 | Paton et al. | 384/423 |
| 4,637,431 | 1/1987 | Olschewski | 384/425 |
| 5,378,121 | 1/1995 | Hackett . | |
| 5,725,431 | 3/1998 | Myers et al. | 384/420 |

OTHER PUBLICATIONS

McGraw–Hill Encyclopedia of Engineering, "Antifriction Bearing," 1982, Library of Congress Cataloging in Publication Data, pp. 42–43.

Primary Examiner—Lenard A. Footland
Attorney, Agent, or Firm—Townsend and Townsend and Crew LLP

[57] ABSTRACT

A thrust bearing assembly (4), used to counteract axial thrust on a rotary shaft (10, 26), includes a base element (28) to which an articulated element (38) is mounted. The articulated element has a first sliding support surface (76). A rotating element (86), rotatable about a main axis (12), has a second sliding support surface (90) in contact with the first sliding support surface. The base element also has an alignment element (34) circumscribing the periphery of the articulated element. A stabilizer element (56, 78) is situated between and is in contact with both the articulated element and the alignment element. The articulated element can be either a single piece element (38a) or a multiple piece element (38) to provide the desired multi-axis articulated support.

14 Claims, 3 Drawing Sheets

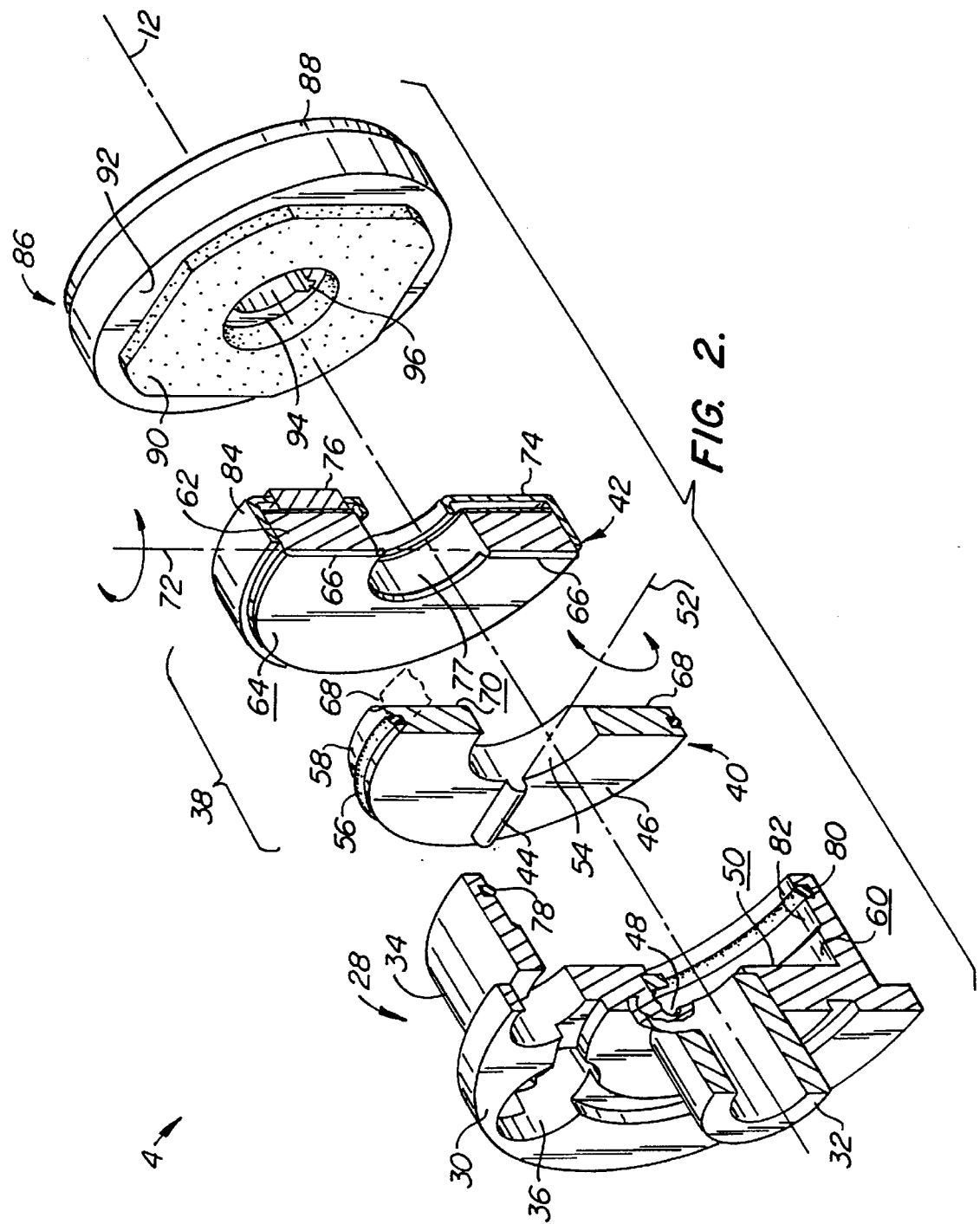

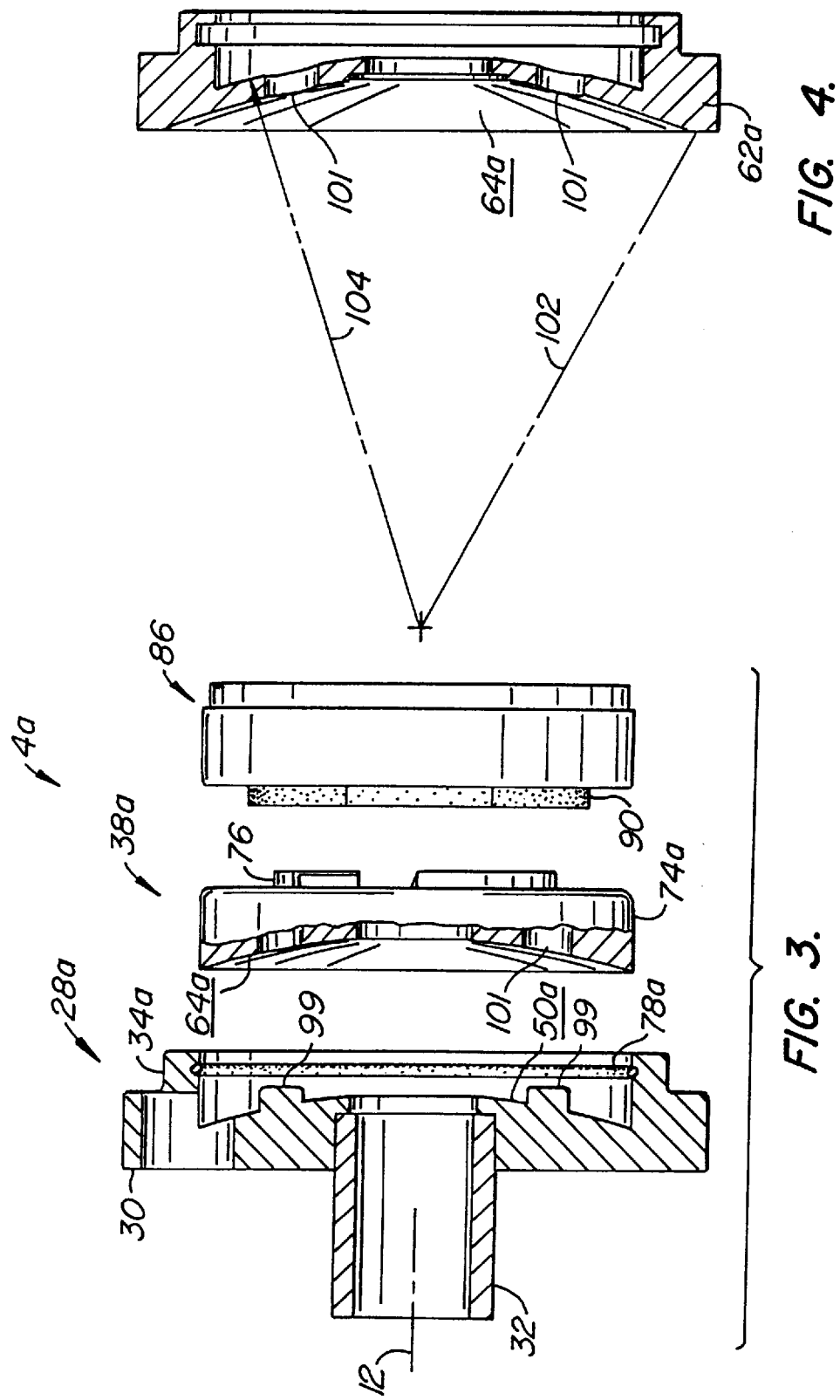

THRUST BEARING ASSEMBLY

BACKGROUND OF THE INVENTION

Generally, submersible motors are configured to operate in the vertical position, such as in deep wells wherein the motor is placed underneath the pump assembly so the pump is upstream of the motor. Current design philosophy is that it is more efficient for the motor to push the fluid than to pull it. However, this upstream pump/motor configuration places the shaft assembly in compression instead of in tension. The compressed shaft has a tendency to misalign resulting in excessive wear on both the bearings and the shafts.

SUMMARY OF THE INVENTION

The present invention is directed to a thrust bearing assembly used to counteract axial thrust on a rotary shaft, and finds particular utility when used with a submersible motor. The submersible motor can be installed either vertically, above the pump, or horizontally, behind the pump. In either of these configurations the shaft is under tension, is self-aligning and causes relatively little wear in bearing assemblies.

The thrust bearing assembly, typically a Kingsbury-type bearing assembly, includes a base element to which an articulated element is mounted. The articulated element has a first sliding support surface. A rotating element, rotatable about a main axis, has a second sliding support surface in contact with the first sliding support surface. The articulated element ensures proper contact is maintained between the sliding support surfaces as the rotating element rotates. The base element also has an alignment element circumscribing the periphery of the articulated element. A stabilizer element is situated between and is in contact with both the articulated element and the alignment element.

The stabilizer element is preferably an O-ring captured between the alignment element, typically in the form of a tube, and the articulated element. The stabilizer element acts to prevent the alignment element from rattling or vibrating against the alignment tube and also helps to maintain the proper alignment of the articulated element.

The articulated element can be either a single piece element or a multiple piece element to provide the desired multi-axis articulation. The articulated element has a radially-extending, sliding support surface, preferably in the form of a number of carbon shoes. A rotating wear surface, typically a ceramic pad, is carried by the rotating element, which rotates with the motor drive shaft and abuts the carbon shoes. In one embodiment the articulated element comprises first and second parts which are mounted to pivot about axes oriented at 90° to one another. In another embodiment the articulated element is a single piece element and the articulated element and the base element have complementary spherical bearing surfaces to provide the multi-axis articulated support.

Other features and advantages of the invention will appear from the following description in which the embodiment has been set forth in detail in conjunction with the accompanying drawings.

BRIEF DESCRIPTION OF THE DRAWINGS

FIG. 2 is a partial cross-sectional, exploded isometric view of a thrust bearing assembly made according to the invention;

FIG. 3 is a side, partial cross-sectional view of an alternative embodiment of the thrust bearing assembly of FIG. 2; and FIG. 4 is an enlarged cross-sectional view of the base of the articulated element of FIG. 3 illustrating the spherical surface portions.

DESCRIPTION OF THE PREFERRED EMBODIMENT

Figure 1:
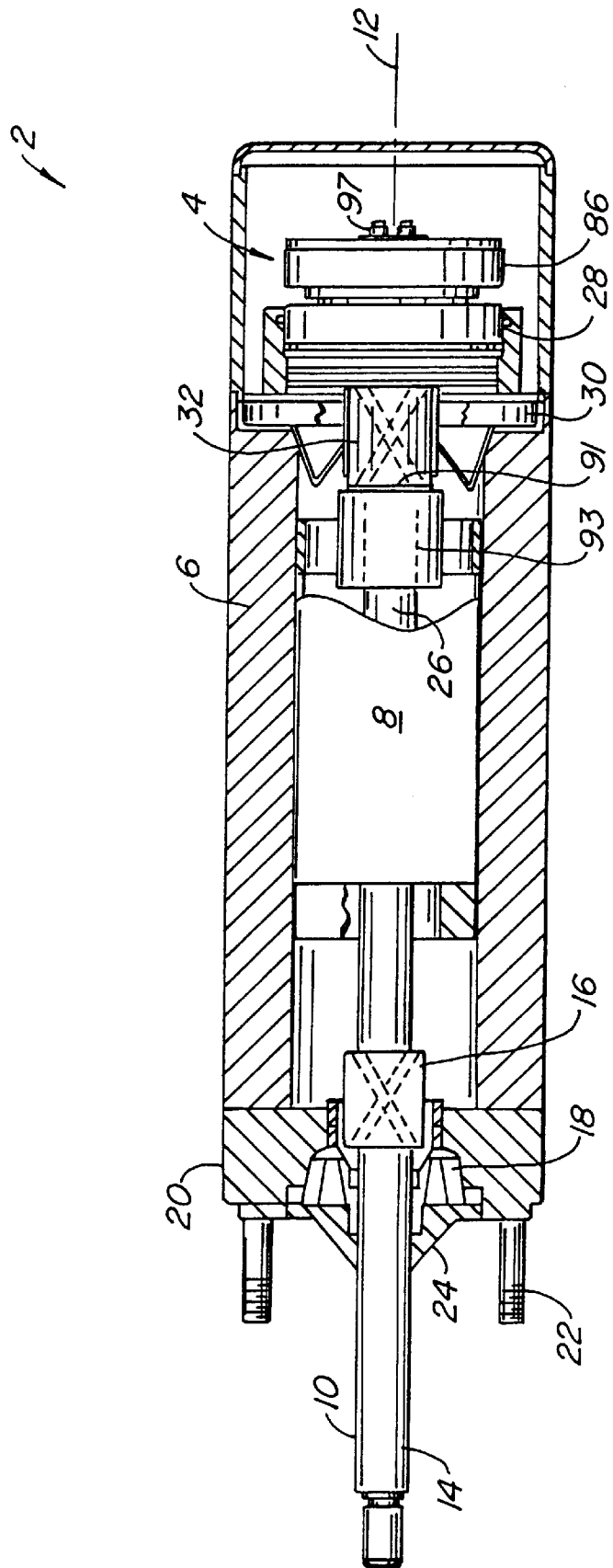
FIG. 1 is a simplified side-cross-sectional of a submersible motor using a thrust bearing assembly made according to the invention.

FIG. 1 illustrates a submersible motor 2 incorporating a thrust bearing assembly 4 made according to the invention. Submersible motor 2 includes broadly a stator 6 housing a rotor 8. A motor drive shaft 10 extends axially from each end of rotor 8 and is rotated about an axis 12. The pump end 14 of shaft 10 extends through and is supported by a journal bearing 16, the journal bearing positioned and supported by a bearing support 18 housed within an end piece 20. Mounting studs 22 extend from end piece 20 to permit motor 2 to be mounted within, for example, a motor housing of a pump assembly. One such application is illustrated in U.S. Pat. No. 5,378,121 entitled "Pump With Fluid Bearing," the disclosure of which is incorporated by reference. A bellows seal 24 engages rotating shaft 10 at pump end 14 to help seal the interior of stator 6. However, it is expected that the interior of stator 6 is not hermetically sealed.

The thrust bearing end 26 of motor drive shaft 10 passes through thrust bearing assembly 4. Thrust bearing assembly 4, shown in more detail in FIG. 2, includes a base element 28 having a radially extending mounting flange 30 on which base element 28 is mounted to stator 6. Base element 28 also includes a journal bearing 32 which radially supports end 26 of shaft 10. Base element has a generally cylindrical alignment tube 34 extending co-axially with journal bearing 32 from the opposite side of mounting flange 30. Mounting flange 30 has a number of coolant passageways 36 formed therethrough to permit any coolant in the vicinity of thrust bearing assembly 4 to flow freely through mounting flange 30 both inside and outside of alignment tube 34.

Assembly 4 also includes an articulated element 38 which, in the embodiment of FIG. 2, comprises first and second parts 40, 42 of articulated element 38. First part 40 has a pair of semi-cylindrical extensions 44 extending from one face 46 which pivotally engage similarly sized and oriented grooves 48 formed in an opposed base surface 50 of base element 28. In this way, first part 40 is permitted a degree of pivotal movement about a second axis 52, the second axis being oriented perpendicular to first axis 12.

First element 40 has a central bore 54 formed centrally within the element 40 to be oversized with end 26 of drive shaft 10. First part 40 is centered within alignment tube 34 by the engagement of an O-ring 56 carried within the grooved periphery 58 of first part 40. O-ring 56, which is preferably made of an elastomeric material, not only radially orients first part 40 by engagement with an inner circumferential surface 60 of alignment tube 34, but also helps to dampen vibration and other undesirable movements of articulated element 38.

Second part 42 includes a disk-like base 62 having a surface 64 facing first part 40. Surface 64 has a pair of semi-cylindrical elements 66 extending therefrom, element 66 being similar to elements 44. Elements 66 are sized to engage similarly sized and positioned grooves 68 formed in the opposed surface 70 of first part 40. Semi-cylindrical element 66, when engaged within grooves 68, pivot a small amount about a third axis 72, passing through semi-cylindrical element 66. Grooves 68 are oriented at a 90° angle from semi-cylindrical elements 44 so that axes 52, 72 are oriented at 90° to one another.

Second part 42 also includes a formed metal keeper 74 used to support and position three carbon shoes 76. In the preferred embodiment each carbon shoe 76 is an annular section extending over an arc of about 60°. A greater or lesser number of annular shoes 66 of the same or different sizes can also be used.

Both base 62 and metal keeper 74 define an oversized bore 77 through which end 26 of shaft 10 passes. Second part 42 is radially aligned within alignment tube 34 by engagement of an O-ring 78 housed within an appropriately-positioned groove 80 formed in a second inner circumferential surface 82. O-ring 78 engages the outer periphery 84 of metal keeper 74 to align second part 42 and dampen vibrations of the second part.

Thrust bearing assembly 4 also includes a rotating element 86 having a body 88 with a ceramic pad 90 mounted to a face of body 88 by a metal keeper 92. Body 88 also includes a central bore 94 having a keyway 96 formed into body 88 to permit the distal end 97 (see FIG. 1) of end 26 of drive shaft 10 to be rotationally and axially secured to element 86.

Thrust bearing assembly 4 is designed to oppose axial thrust forces on thrust bearing end 26 of drive shaft 10 when those forces are tension forces. When those forces are in tension, drive shaft 26 tends to pull to the left in FIG. 1, thus forcing rotating element 86 against articulated element 38 as rotating element 86 rotates about axis 12. This rotational movement and thrust force is accommodated through the smooth bearing surfaces provided by carbon shoes 76 and ceramic pad 90. Small misalignments are accommodated by the small rotational motions about second and third axes 52, 72 to ensure proper full contact between carbon shoes 76 and ceramic pads 90. O-rings 56, 78 not only center or radially position parts 40, 42 of articulated element 38 but also act to dampen any undesirable vibration or chattering created by the rotation of rotating element 86.

At times, such as during the initial start-up of the system, pump end 14 of motor drive shaft 10 may be temporarily placed into compression. This axial movement, which tends to drive motor drive shaft 10 to the right in FIG. 1, is resisted by journal bearing 32 contacting a PTFE washer 91 captured between journal bearing 32 and a cylindrical sleeve 93 press-fit onto end 26 of shaft 10.

FIGS. 3 and 4 illustrate an alternative embodiment of thrust bearing assembly 4 of FIG. 2 with like reference numerals referring to like elements. Thrust bearing assembly 4a comprises a base element 28a having a fore-shortened alignment tube 34a which accommodates a one-piece articulated element 38a. Articulated element 38a is similar to second part 42 but has a semi-spherical surface 64a sized to engage a similarly sized and shaped semi-spherical surface 50a of base element 28a. In this way, axial force exerted by rotating element 86 through ceramic pad 90 and carbon shoes 76 is exerted directly through surfaces 64a, 50a; the spherical nature of surfaces 64a, 50a accommodate slight misalignments to ensure proper, full contact of shoes 76 and surface 90. Similarly, articulated element 38a is radially positioned by engagement with an O-ring 78a carried by base element 28a. O-ring 78a also acts to dampen vibrations of articulated element 38a within alignment tube 34a. To prevent articulated element 38a from rotating within base element 28a, which would damage O-ring 78a, surface 50a has a pair of axially-extending pins 99 which engage oversized holes 101 formed in surface 64a.

FIG. 4 illustrates base 62a of articulated element 38a showing in more detail the inner spherical radius 102 used to define surface 64a. In the preferred embodiment this is about SR 3.625 inch. Outer spherical radius 104, about 3.750 inch in the preferred embodiment, is chosen to be sufficiently large to provide sufficient strength for surface 64a while conserving material. This configuration eliminates one entire part found in other Kingsbury-type bearings, shortens the motor shaft length, and simplifies machining to close tolerances in manufacturing process.

In the preferred embodiments, journal bearing 32 is preferably made of brass alloy while O-rings 56, 78 are preferably made of synthetic rubber. The remainder of base element 28 and first part 40 are preferably of stainless steel. With the exception of ceramic pad 90 and carbon shoes 76, second part 42 and rotating element are preferably made of stainless steel. The materials chosen will depend at least in part on the chemical environment, cost factors, reliability concerns, and other such matters.

Modification and variation can be made to the disclosed embodiment without departing from the subject of the invention as defined in the following claims.

What is claimed is:

1. A thrust bearing assembly, used to counteract axial thrust on a rotary shaft, comprising:
   a base element;
   an articulated element mounted against the base element for articulated support by the base element;
   the articulated element comprising a periphery and a first sliding support surface;
   a rotating element, rotatable about a main axis, having a second sliding support surface in contact with the first sliding support surface;
   the base element comprising an alignment element associated with the articulated element; and
   a stabilizer element in contact with the articulated element and the alignment element.

2. The assembly according to claim 1 wherein the alignment element at least partially circumscribes at least a part of the articulated element periphery.

3. The assembly according to claim 1 wherein the base element, articulated element and rotating element have central bores generally aligned with said main axis.

4. The assembly according to claim 1 wherein the articulated element comprises first and second parts, said first part movable, relative to the bore element, about a first axis, and said second part movable, relative to the first part, about a second axis, said first and second axes being transverse to one another and to said main axis.

5. The assembly according to claim 4 wherein said stabilizer element comprises first and second stabilizers in contact with said first and second parts, respectively.

6. The assembly according to claim 1 wherein the articulated element and the base element comprise mating semi-spherical surfaces to provide said articulated support of the articulated element against the base element.

7. The assembly according to claim 1 wherein said first and second sliding support surfaces comprise a carbon shoe and a ceramic pad.

8. The assembly according to claim 1 wherein said stabilizer element comprises an elastomeric stabilizer element.

9. The assembly according to claim 1 wherein said stabilizer element comprises an O-ring.

10. A thrust bearing assembly, used to counteract axial thrust on a rotary shaft, comprising:

a base element;

an articulated element mounted against the base element for multi-axis articulated support by the base element;

the articulated element comprising a periphery and a first sliding support surface;

a rotating element, rotatable about a main axis, having a second sliding support surface in contact with the first sliding support surface;

the base element comprising an alignment element circumscribing the articulated element periphery;

an elastomeric stabilizer element situated between and in contact with the articulated element and the alignment element; and the articulated element and the base element comprise mating semi-spherical surfaces to permit said multi-axis articulated support of the articulated element against the base element.

11. An improved submersible pump comprising a motor contained in a housing, the motor comprising a rotatable drive shaft, the improvement comprising:

a thrust bearing assembly comprising:

a base element se cured to and within the housing;

an articulated element mounted against the base element for articulated support by the base element;

the articulated element comprising a periphery and a first sliding support surface;

a rotating element, secured to for rotation with the motor drive shaft, having a second sliding support surface in contact with the first sliding support surface;

is the base element comprising an alignment element associated with the articulated element; and a stabilizer element in contact with the articulated element and the alignment element.

12. The pump according to claim 11 wherein the alignment element at least partially circumscribes at least a part of the articulated element periphery.

13. The pump according to claim 11 wherein the articulated element and the base element comprise mating semi-spherical surfaces to perm it said articulated support of the articulated element against the base element.

14. The pump according to claim 11 wherein said first and second sliding support surfaces comprise a carbon shoe and a ceramic pad.

* * * * *

UNITED STATES PATENT AND TRADEMARK OFFICE
CERTIFICATE OF CORRRECTION

PATENT NO. : 5,820,271
DATED : October 13, 1998
INVENTOR(S) : Hackett, Jr.

It is certified that error appears in the above-identified patent and that said Letters Patent is hereby corrected as shown below:

On the title page, add the following to item [56]:

U. S. PATENT DOCUMENTS

| EXAMINER INITIAL | PATENT NUMBER | | | | | | | ISSUE DATE | PATENTEE | CLASS | SUBCLASS | FILING DATE IF APPROPRIATE |
|---|---|---|---|---|---|---|---|---|---|---|---|---|
| | 4 | 6 | 3 | 7 | 7 | 4 | 0 | 01/20/87 | Olschewski et al. | | | |
| | | | | | | | | | | | | |

Signed and Sealed this

Sixth Day of April, 1999

Attest:

Q. TODD DICKINSON

*Attesting Officer*   *Acting Commissioner of Patents and Trademarks*